US012067881B1

United States Patent
Khmelev et al.

(10) Patent No.: US 12,067,881 B1
(45) Date of Patent: Aug. 20, 2024

(54) MOTOR VEHICLE SAFETY SYSTEMS AND METHODS FOR PROTECTING BICYCLISTS

(71) Applicant: UIPCO, LLC, San Antonio, TX (US)

(72) Inventors: Yevgeniy Viatcheslavovich Khmelev, San Antonio, TX (US); Christopher Russell, The Colony, TX (US); Gregory David Hansen, San Antonio, TX (US); Nathan Lee Post, Rockport, TX (US); Ashley Raine Philbrick, San Antonio, TX (US); Nolan Serrao, Plano, TX (US); Ruthie D. Lyle, Durham, NC (US); Pooja Krishnaswamy, McKinney, TX (US); Noemy Diosdado, Como, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 196 days.

(21) Appl. No.: 17/484,826

(22) Filed: Sep. 24, 2021

Related U.S. Application Data (60) Provisional application No. 63/084,880, filed on Sep. 29, 2020.

(51) Int. Cl.
*G08G 1/16* (2006.01)
*B60W 40/04* (2006.01)
(Continued)

(52) U.S. Cl.
CPC ............ *G08G 1/166* (2013.01); *B60W 40/04* (2013.01); *B60W 40/06* (2013.01);
(Continued)

(58) Field of Classification Search
CPC .......... G08G 1/166; H04W 4/90; H04W 4/40; G06F 16/24575; B60W 60/0017;
(Continued)

(56) References Cited

U.S. PATENT DOCUMENTS

| 10,144,474 | B2 * | 12/2018 | Rajamani | ................... B62J 3/10 |
| 2011/0133918 | A1 * | 6/2011 | Lee | .......................... B62J 50/22 |
| | | | | 340/436 |

(Continued)

OTHER PUBLICATIONS

Anaya et al, "Vulnerable Road Users Detection using V2X Communications", 2015, IEEE (Year: 2015).*

(Continued)

*Primary Examiner* — Hussein Elchanti
*Assistant Examiner* — Kenneth M Dunne
(74) *Attorney, Agent, or Firm* — Plumsea Law Group, LLC (57) ABSTRACT

Safety for bicyclists while travelling on a road near to certain motor vehicles is achieved through the use of systems and methods that communicate the physical location of the bicyclist in relation to the motor vehicle. The systems and methods allow a bicyclist to generate a "safety bubble" of an exclusion zone set of location coordinates. The motor vehicle is automatically prompted to navigate away from the exclusion zone. The exclusion zone of location coordinates may be generated based on the bicyclist user's preferences, as well as legal data and road data. By drawing from these several parameters, the exclusion zone may be sized and located so as to best meet the bicyclist's need without unduly impacting traffic flow.

18 Claims, 9 Drawing Sheets

(51) Int. Cl.
  *B60W 40/06* (2012.01)
  *B60W 60/00* (2020.01)
  *G06F 16/2457* (2019.01)
  *H04W 4/40* (2018.01)
  *H04W 4/90* (2018.01)

(52) U.S. Cl.
  CPC ... *B60W 60/0017* (2020.02); *G06F 16/24575* (2019.01); *H04W 4/40* (2018.02); *H04W 4/90* (2018.02); *B60W 2554/4026* (2020.02); *B60W 2554/801* (2020.02); *B60W 2554/802* (2020.02); *B60W 2555/60* (2020.02); *B60W 2556/50* (2020.02)

(58) Field of Classification Search
  CPC .. B60W 40/04; B60W 40/06; B60W 2556/50; B60W 2554/4026; B60W 2555/60; B60W 2554/802; B60W 2554/801
  See application file for complete search history.

(56) References Cited

U.S. PATENT DOCUMENTS

| | | | |
|---|---|---|---|
| 2012/0025962 A1* | 2/2012 | Toll | B60Q 1/50 340/468 |
| 2013/0057397 A1* | 3/2013 | Cutler | G08G 1/167 701/25 |
| 2013/0060400 A1* | 3/2013 | Hahne | G08G 1/161 701/1 |
| 2016/0049079 A1* | 2/2016 | Ibrahim | G08G 1/164 340/944 |
| 2016/0144915 A1* | 5/2016 | Bejestan | G09B 9/058 340/432 |
| 2016/0280127 A1* | 9/2016 | Needham | B62J 27/00 |
| 2017/0080952 A1* | 3/2017 | Gupta | G08G 1/167 |
| 2018/0056997 A1* | 3/2018 | Ohmura | B60W 10/06 |
| 2018/0059670 A1* | 3/2018 | Nilsson | B60W 30/18163 |
| 2018/0079463 A1* | 3/2018 | Pearce | B62J 45/412 |
| 2018/0165965 A1* | 6/2018 | Ewert | H04W 4/40 |
| 2018/0286232 A1* | 10/2018 | Shau | G08G 1/005 |
| 2018/0345957 A1* | 12/2018 | Ohmura | B60W 30/095 |
| 2019/0079527 A1* | 3/2019 | Censi | G05D 1/0221 |
| 2019/0210681 A1* | 7/2019 | Shin | B62J 45/42 |
| 2019/0236955 A1* | 8/2019 | Hu | G08G 1/096716 |
| 2019/0351896 A1* | 11/2019 | Solmaz | G08G 1/0962 |
| 2020/0019161 A1* | 1/2020 | Stenneth | B60W 50/14 |
| 2020/0021961 A1* | 1/2020 | Li | G05D 1/0022 |
| 2020/0023837 A1* | 1/2020 | Yokoi | B60W 30/0953 |
| 2020/0079363 A1* | 3/2020 | Frederick | G06V 10/147 |
| 2020/0398833 A1* | 12/2020 | Hudecek | B60W 60/001 |
| 2021/0118303 A1* | 4/2021 | Chan | B60Q 1/525 |
| 2021/0158687 A1* | 5/2021 | Beauchamp | G06N 3/08 |
| 2021/0183249 A1* | 6/2021 | Beauchamp | G01S 19/393 |
| 2021/0237769 A1* | 8/2021 | Ostafew | G08G 1/163 |
| 2022/0332350 A1* | 10/2022 | Jha | H04W 4/024 |

OTHER PUBLICATIONS

Scholliers et al, "Integration of vulnerable road users in cooperative ITS systems", 2017, Springer (Year: 2017).*

Reid et al, "Final Project Report PPR580 Infrastructure and cyclist Safety", 2010, Department of Transport (Year: 2010).*

* cited by examiner

MOTOR VEHICLE SAFETY SYSTEMS AND METHODS FOR PROTECTING BICYCLISTS

CROSS-REFERENCE TO RELATED APPLICATIONS

This application claims the benefit of Provisional Patent Application No. 63/084,880 filed Sep. 29, 2020 and titled "Motor Vehicle Safety Systems and Methods for Protecting Bicyclists", which is incorporated by reference herein in its entirety.

TECHNICAL FIELD

The present disclosure generally relates to the safety of bicyclists travelling on a road in relation to nearby motor vehicles that are using autonomous or semi-autonomous navigation systems, and specifically to systems and methods for ensuring such motor vehicles safely pass bicyclists on the road.

BACKGROUND

Many motor vehicle "self-driving" systems are known in the art. Some well-known autonomous and semi-autonomous driver-assistance systems include Tesla's Autopilot, Nissan's ProPilot Assist, Alphabet's Waymo, and the work of the Autonomous Vehicle Computing Consortium. Generally, autonomous vehicle systems seek to relieve drivers from the fatigue and concentration necessary to drive a motor vehicle for long periods of time. However, motor vehicle drivers are not the only stakeholders who routinely travel on the roads. Cyclists are another large community of people who regularly travel on roads for both utilitarian travel reasons as well as for fitness and pleasure. Many autonomous vehicle systems use visual camera data or LIDAR to detect and measure unusual road conditions such as the presence of a cyclist, to which the system then reacts to try to ensure the safety of all involved.

However, in many cases, existing systems for ensuring safety between a cyclist and a motor vehicle using an autonomous vehicle navigation system may not sufficiently meet the safety needs and preferences of cyclists. Namely, the autonomous motor vehicle may respond to the presence of the cyclist on the road based on its own programming, without incorporating any communication from the cyclist—and therefore may not respect the cyclist's safety needs.

Accordingly, there is a need in the art for systems, mobile computing devices, and methods that addresses the shortcomings discussed above.

SUMMARY

In one aspect, the disclosure provides a system for enhancing motor vehicle safety in a vicinity of a bicyclist travelling on a road, comprising: a mobile computing device associated with a bicyclist user; and at least one server computing device in electronic communication with the mobile computing device, the server computing device including a processor and machine-readable media including instructions which, when executed by the processor, cause the processor to (1) receive from the mobile computing device location data describing a location of the mobile computing device; (2) calculate a safety distance around the location of the mobile computing device; (3) calculate an exclusion zone set of location coordinates based on the safety distance and the location of the mobile computing device; and (4) send to a motor vehicle computing device the exclusion zone set of location coordinates, wherein the motor vehicle computing device is configured to maneuver the motor vehicle such that no part of the motor vehicle enters an area described by the exclusion zone set of location coordinates.

In another aspect, the disclosure provides a method of enhancing motor vehicle safety in a vicinity of a bicyclist, the method comprising: (1) receiving user location data descriptive of a bicyclist user travelling on a road; (2) calculating a safety distance around the location of the bicyclist user; (3) calculating an exclusion zone set of location coordinates based on the safety distance and the user location data; and (4) sending the exclusion zone set of location coordinates to a motor vehicle navigation system.

Finally, in yet another aspect, the disclosure provides a mobile computing device, configured to: receive location data from a location positioning system describing a location of the mobile computing device; receive a safety distance input from a user, the safety distance input being descriptive of the user's minimum safety distance preference; calculate a safety distance around the location of the mobile computing device that is equal to or greater than the user minimum safety distance preference; calculate an exclusion zone set of location coordinates based on the safety distance and the location of the mobile computing device; and send the exclusion zone set of location coordinates to a motor vehicle computing device.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Systems to provide improved safety for bicyclists travelling on a road when approached by an autonomous (or semi-autonomous) motor vehicle are provided. Generally, a mobile computing device carried by the bicyclist receives location data such as GPS coordinates, generates an exclusion zone around the location of the mobile computing device, and communicates the exclusion zone to the nearby motor vehicle so that the motor vehicle does not enter the exclusion zone around the cyclist.

Related methods and apparatuses, such a mobile computing device (aka a smartphone or a wearable), are also disclosed—as well as a non-transitory computer readable storage medium including instructions which, when executed by one or more computing devices, carry out a method for providing improved safety for bicyclists travelling on a road when approached by an autonomous or semi-autonomous motor vehicle.

Figure 1:
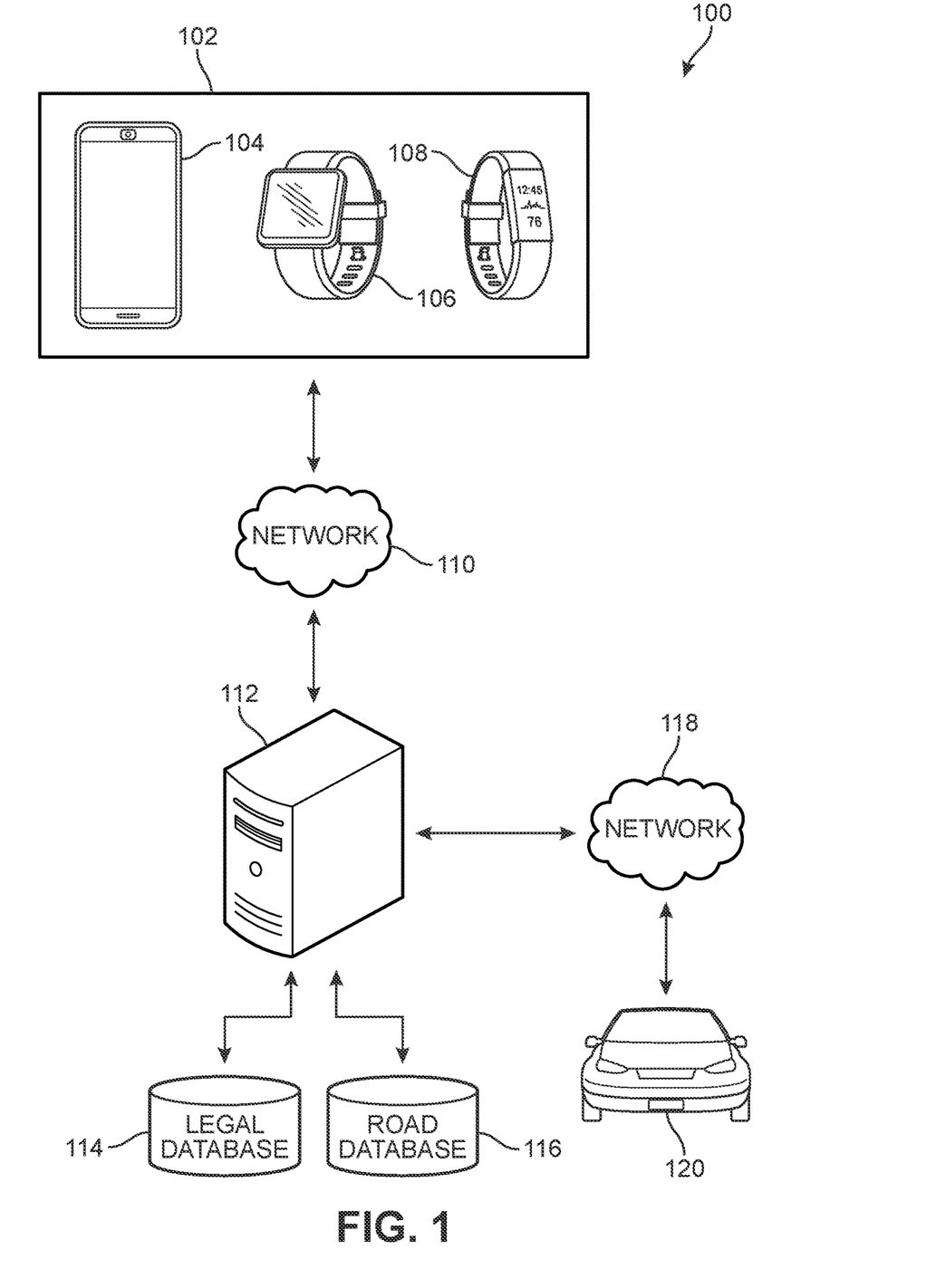
FIG. 1 is a diagram of a system that includes several pieces of hardware in electronic communication with each other.

Most broadly, as shown in FIG. 1, a system 100 for enhanced cyclist safety may include a mobile computing device 102, and a server computing device 112 that is in communication with one or more databases 114/116 and also in communication with a motor vehicle computing device 120.

Generally, a mobile computing device 102 may include any computing device that is configured to be carried and transported by a person—and communicate wirelessly with one or more networks. In particular, a mobile computing device 102 may comprise a smartphone 104 such as an iPhone™ or a smartphone running the Android™ operating system. Alternatively, a mobile computing device 102 may comprise a wearable computing device such as a smartwatch 106 or a fitness tracker 108. Mobile computing device 102 may broadly encompass any mobile device that includes a processor, machine readable media including electronic instructions which may be executed by the processor, the ability to receive location coordinates descriptive of the geographic location of the mobile device, and wireless networking hardware allowing the mobile device to communicate with other computing devices over a wireless network.

Server computing device 112 may generally be any computing device that includes a processor and machine-readable media that includes instructions which may executed by the processor. Broadly, the processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Next, system 100 may include network 110 that may allow mobile computing device 102 to be in electronic communication with server computing device 112. Generally, the embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

In the embodiment shown in FIG. 1, server computing device 112 may be in electronic communication with the mobile computing device 102—and then server computing device 112 may be in electronic communication with other components of system 100 such as motor vehicle computing device 120. However, in other embodiments, mobile computing device 102 may be in direct electronic communication with motor vehicle computing device 120—as discussed below with respect to FIG. 4.

Server computing device 112 may be configured to access one or more databases either remotely over a network or locally. Legal database 114 may be a database that includes data that is descriptive of legal information regarding a minimum safety distance required by law between a moving motor vehicle and a bicyclist travelling on a road in various legal jurisdictions. Further details of legal database are discussed below with respect to FIG. 5.

Road database 116 may also be in electronic communication with server computing device 112. Road database 116 may be a database that includes data that is descriptive of one or more aspects of a road where the mobile computing device is located. Road aspects may include permanent features of the road, such as: number of lanes, existence or lack of a road shoulder area, speed limit, etc. Road aspects may also include transitory features of the road, such as: weather conditions, traffic conditions, road construction, or other temporary road closures. In some embodiments, road database 116 may be a third party database such as those run and operated by Google Maps, Waze, NOAA, OpenStreet-Map, or others.

Next, server computing device 112 may be in electronic communication with motor vehicle computing device 120 via network 118. Network 118 may be any type of network, as discussed above with respect to network 110. Motor vehicle computing device 120 may be an autonomous or semi-autonomous motor vehicle navigation system, that is capable of at least partially controlling the movement of the motor vehicle without necessarily receiving an input from a driver user.

The system 100 of FIG. 1 may be used to enhance motor vehicle and bicyclist safety. Namely, server computing device 112 may include machine-readable media including instructions which, when executed by the processor in server computing device 112, cause the processor to execute a series of actions. These actions are shown in FIG. 2.

Figure 2:
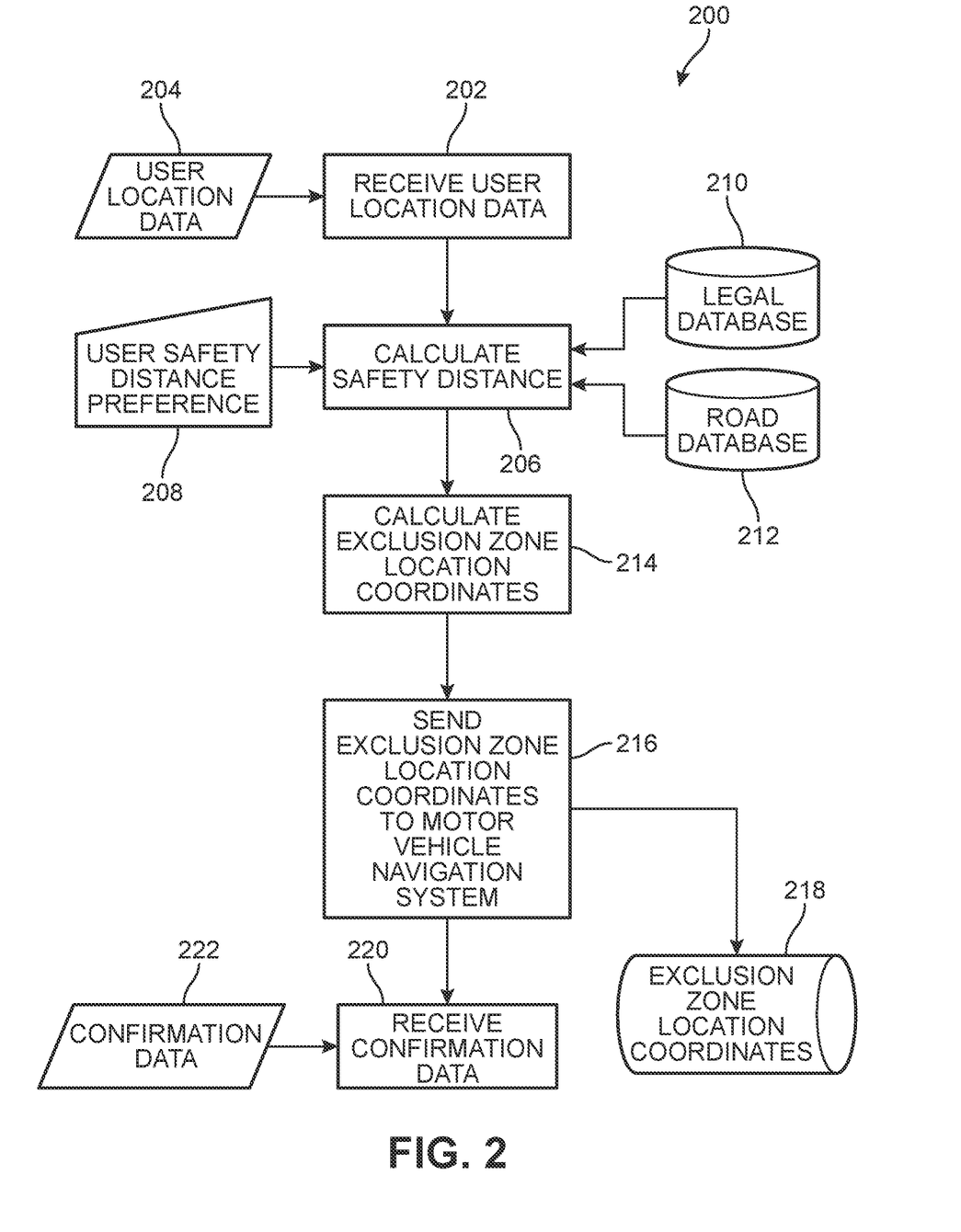
FIG. 2 shows a flowchart of a process in accordance with this disclosure.

Namely, FIG. 2 shows a method 200 for enhancing motor vehicle safety in a vicinity of a bicyclist. Method 200 may first include step 202 of receiving user location data 204. In some embodiments, server computing device 112 may receive user location data 204 from mobile computing device 102. In such embodiments, the user location data 204 may be descriptive of the location of the geographic mobile computing device 102. Generally, user location data 204 may comprise global positioning system ("GPS") data that uses GPS satellites to accurately determine the location of mobile computing device 102.

Next, method 200 may include step 206 of calculating a safety distance around the location of the mobile computing device. In various embodiments, step 206 may incorporate various inputs and other data. For example, step 206 may include receiving an input 208 from a bicyclist user that is descriptive of the user's safety distance preference. Input 208 may be descriptive of a minimum safety distance, or alternatively descriptive of an exact safety distance, or alternatively descriptive of both a minimum safety distance preference and a maximum safety distance preference.

Step 206 may also include querying one or more databases, and receiving data back in response to the query. Namely, step 206 may include querying a legal database 210 and receiving in response legal data that is descriptive of a minimum safety distance required by law between a moving motor vehicle and a bicyclist in a certain legal jurisdiction. In particular, at step 206, server computing device 112 may query legal database 114 to find relevant legal data in the jurisdiction where the mobile computing device 102 is located based on the user location data 204 received in step 202. In response to this query, system 100 may receive a legal minimum safety distance input that is descriptive of the minimum safety distance required by law between a moving motor vehicle and a bicyclist on the road.

Step 206 may also include querying road database 212 and receiving, in response to the query, road data that is descriptive of one or more aspects of the road where the mobile computing device 102 is currently located—again based on the user location data 204 received by server computing device 112 at step 202. Various aspects of the road, described by the data received from the road database, may be as discussed above.

Step 206 of calculating a safety distance may therefore perform one or more series of calculations to arrive at an appropriate safety distance around the location of the mobile computing device. For example, the step 206 of calculating a safety distance may include calculating a safety distance that is equal to or greater than the legal minimum safety distance received from legal database 210. In another example, step 206 may receive user safety distance preference 208, compare the user safety distance preference to a legal minimum distance received from legal database 210 to determine which is greater, and then may further increase the value of the greater of the two by an additional factor to arrive at the calculated safety distance.

In another example embodiment, step 206 of calculating a safety distance may include calculating the safety distance based on the road data—such as when a larger safety distance might be helpful in the face of unpleasant weather conditions like rain or snow.

In yet another embodiment, step 206 may include calculating a safety distance based on both road data received from the road database 212 and also legal data received from legal database 210. Namely, in certain jurisdictions the law requires passing motor vehicles to change lanes when two lanes going in the same direction of travel are present, and therefore step 206 may include receiving data about the nature of the road where the mobile computing device is present to confirm whether this is the case.

Additionally embodiments of calculations performed at step 206 are discussed below with respect to FIGS. 3A-3C. Nonetheless, method 200 may encompass a wide range of calculations performed at step 206 to arrive at an appropriate safety distance.

Next, at step 214, method 200 may proceed to calculate an exclusion zone set of location coordinates. The exclusion zone set of location coordinates may be based on the location of the mobile computing device 204 and the safety distance calculated at step 206. In this way, server computing device 112 may generate location data that describes were a motor vehicle should not enter in order to keep the bicyclist safe. Generally, exclusion zone set of location coordinates may be formatted in any data format that enables description of moving geographic locations. In particular embodiments, the exclusion zone set of location coordinates generated at step 214 may be data in the format of GPS Exchange Format, NMEA-formatted GPS Data, or others.

The exclusion zone set of location coordinates may next be sent from server computing device 112 to motor vehicle computing device 120 at step 216 of method 200. In the embodiment shown in FIGS. 1 and 2, the exclusion zone location coordinates 218 may be transmitted over a network 118. In some embodiments, network 118 may include one or more additional pieces of intermediate communications hardware—as discussed above. However, in other embodiments, a mobile computing device 102 may send a signal containing the exclusion zone set of location coordinates directly to motor vehicle computing device 120.

Finally, in some embodiments, method 200 may also include step 220 wherein server computing device 112 receives confirmation data 222 back from motor vehicle computing device 120. Confirmation data 222 may be descriptive of the motor vehicle computing device 120 having successfully received the exclusion zone set of location coordinates 218. In this way, system 100 performing method 200 may confirm that the electronic communications were successful—and that the bicyclist is therefore kept safe. In some embodiments, confirmation data 222 may be communicated back to mobile computing device 102. The mobile computing device 102 may then, in turn, alert the bicyclist user through a visual or auditory cue that the safety system 100 has successfully worked as intended (or failed to do so).

Generally, with respect to any of the above aspects of method 200 shown in FIG. 2, aspects of the present disclosure are described in association with figures illustrating flowcharts and/or block diagrams of methods, apparatus (systems), and computing products. It will be understood that each block of the flowcharts and/or block diagrams may be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Figure 3A:
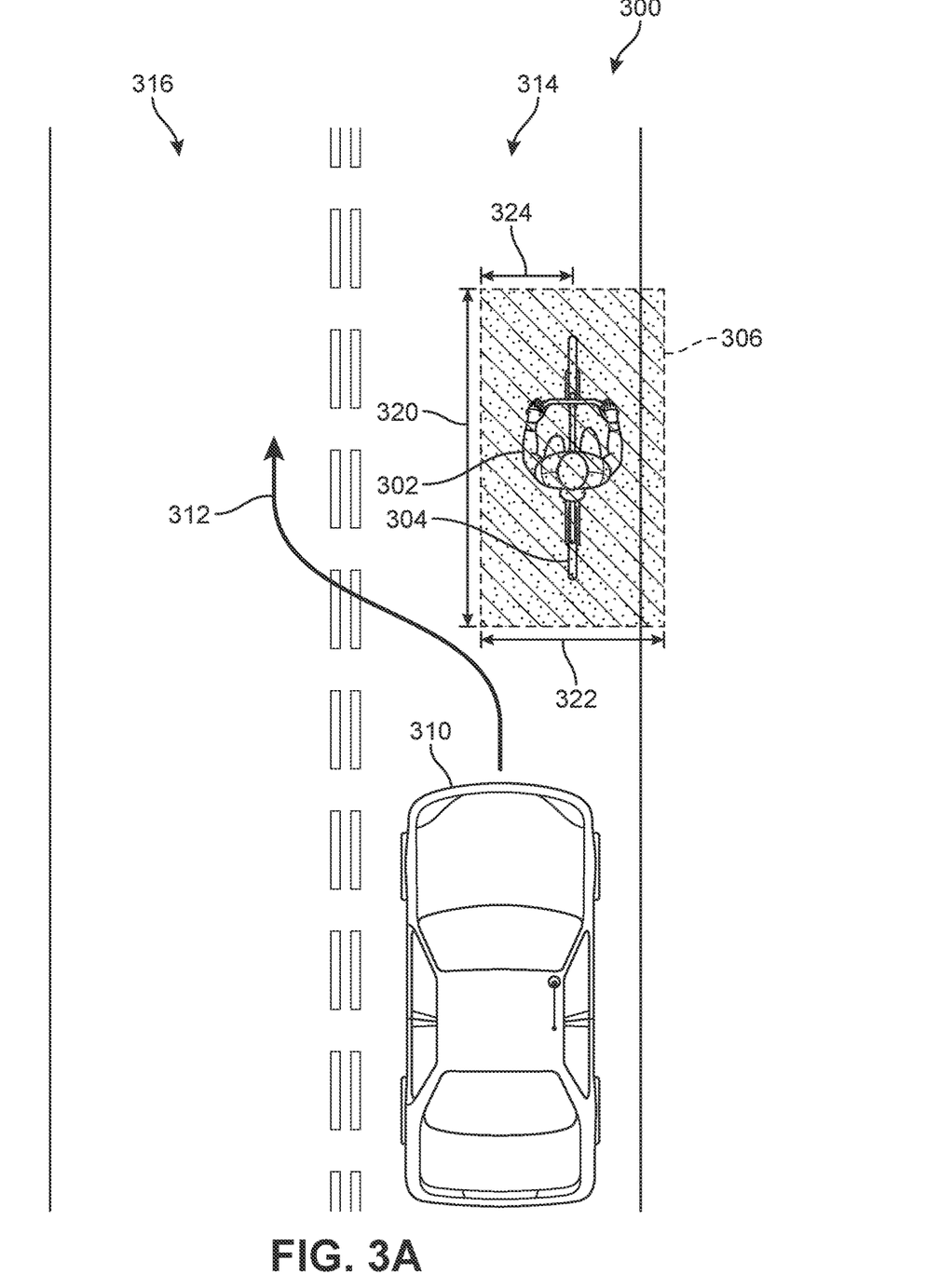
FIG. 3A is a diagram of a first embodiment of a cyclist user protected from a motor vehicle by an exclusion zone.

Next, FIG. 3A shows an overhead view of the system and method in operation so as to create a safety zone around a cyclist 302. Namely, road area 300 shown in FIG. 3A includes cyclist 302 riding bicycle 304, being approached by motor vehicle 310. A mobile computing device carried by the cyclist 302 may communicate with a server, such as is discussed above with respect to FIGS. 1 and 2. Based on location data received from the mobile computing device associated with cyclist 302, exclusion zone 306 may be digitally created around cyclist 302. Namely, exclusion zone 306 may be a digital representation resulting from a set of exclusion zone location coordinates calculated based on a safety distance around the location of the mobile computing device.

In the particular embodiment shown in FIG. 3A, exclusion zone 306 may be a rectangle that is defined by a lateral safety distance 322 and a longitudinal safety distance 320. That is, step 206 in method 200 of calculating a safety distance may include calculating a lateral safety distance 322 and a longitudinal safety distance 320. Generally, as shown, lateral safety distance 322 may extend perpendicular to a direction of travel on the road—and longitudinal safety distance 320 may extend parallel to the direction of travel on the road. Longitudinal safety distance 320 may be larger than lateral safety distance 322. In this way, exclusion zone 306 may encompass both cyclist 302 and bicycle 304.

Motor vehicle 310 containing a vehicle navigation system may then change course 312 from first lane 314 to second lane 316 in response to exclusion zone 306. In some embodiments, motor vehicle 310 may change course 312 based on a driver user input. For example, motor vehicle 310 navigation system may alert the driver of the presence of the cyclist 302 and the exclusion zone 306 around the cyclist 302, such as through the use of a visual alert on a display associated with the vehicle navigation system. That is, the vehicle navigation system may visually display exclusion zone 306 on a screen—and may visually appear similar to how FIG. 3A itself is shown.

However, in other embodiments, motor vehicle 310 may change course 312 automatically without input from the driver. Namely, motor vehicle 310 may be an autonomous or semi-autonomous motor vehicle. In such vehicles, the vehicle navigation system may be configured to maneuver the motor vehicle 310 such that no part of the motor vehicle 310 enters an area described by the exclusion zone set of location coordinates 306. That is, step 216 of method 200 of sending the exclusion zone set of location coordinates 306 to motor vehicle 310 may include sending data descriptive of instructions for the motor vehicle 310 to automatically navigate so as to avoid the exclusion zone 306.

In fully autonomous vehicles, the motor vehicle navigation system may change course 312 as a seamless part of controlling the travel of the autonomous vehicle. In semi-autonomous vehicles, the motor vehicle navigation system may kick-in and automatically change course 312 only when e.g. the motor vehicle begins to cross into the exclusion zone 306—similar to how a semi-autonomous lane departure (or "lane keeping") system may take control of the motor vehicle only when certain conditions are met.

Figure 3B:
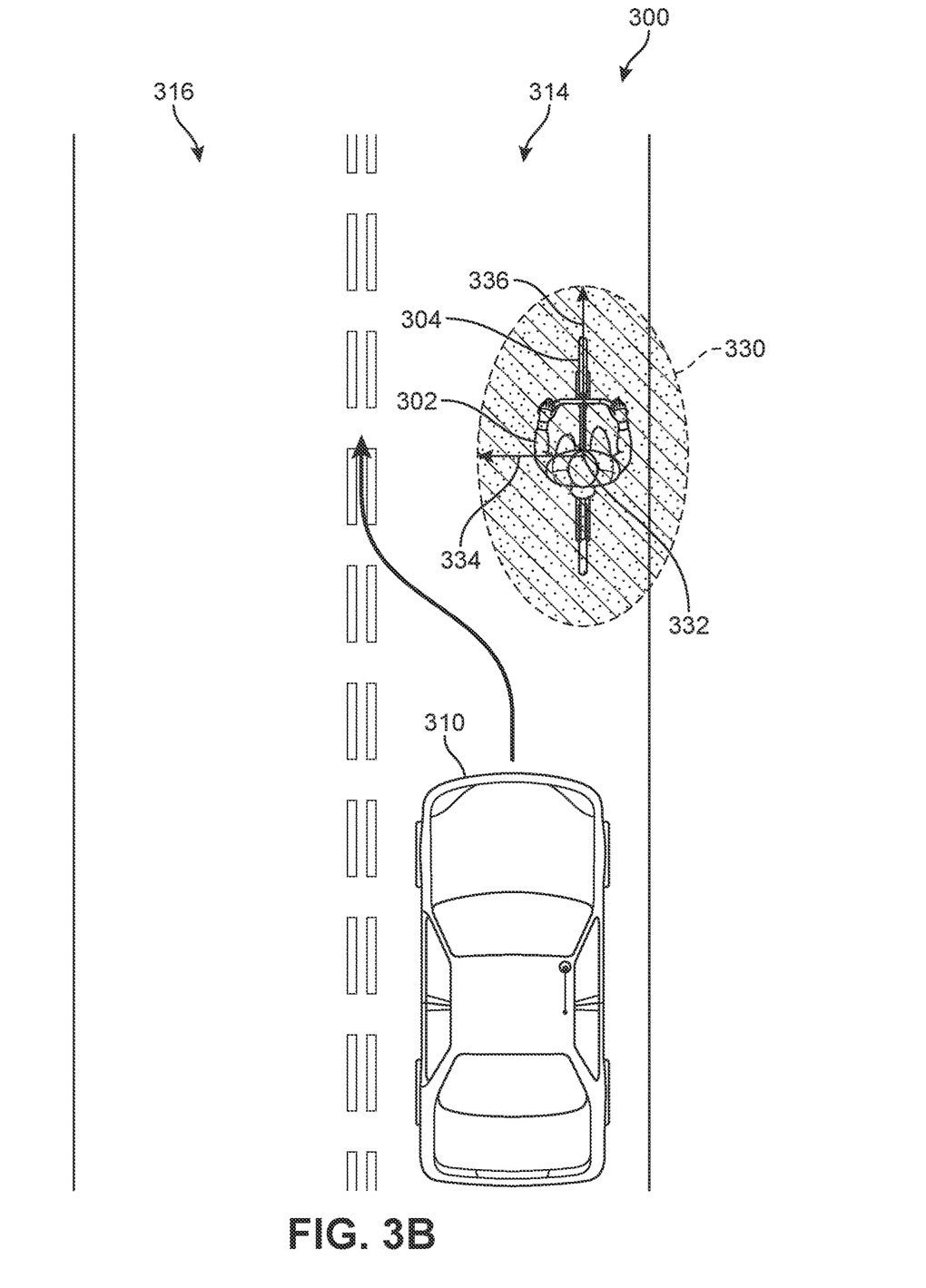
FIG. 3B is a diagram of a second embodiment of a cyclist user protected from a motor vehicle by an exclusion zone.

FIG. 3B shows a second embodiment of an overhead view of a cyclist 302 surrounded by exclusion zone 330. In this embodiment, exclusion zone 330 may be elliptical in shape. Namely, exclusion zone 330 may be defined by first radius 334 and second radius 336. Second radius 336 may be larger than first radius 334, and both may be measure from center point 332 that may substantially correspond to the location of the cyclist 302 on bicycle 304.

The embodiment shown in FIG. 3B may create an ellipse shaped exclusion zone 330 that may provide a desired level of safety for the cyclist 302 while also requiring that motor vehicle 310 change course 313 to a lesser degree than other shapes of the exclusion zone 330. This may be useful when, for example, the cyclist 302 and motor vehicle 310 are travelling in high traffic conditions that would preclude the motor vehicle 310 from fully changing lanes from first lane 314 to second land 316. In this way, the embodiment shown in FIG. 3B may be advantageous for both the cyclist 302 and the motor vehicle 310 by allowing the motor vehicle 310 to more easily pass the cyclist 302.

Figure 3C:
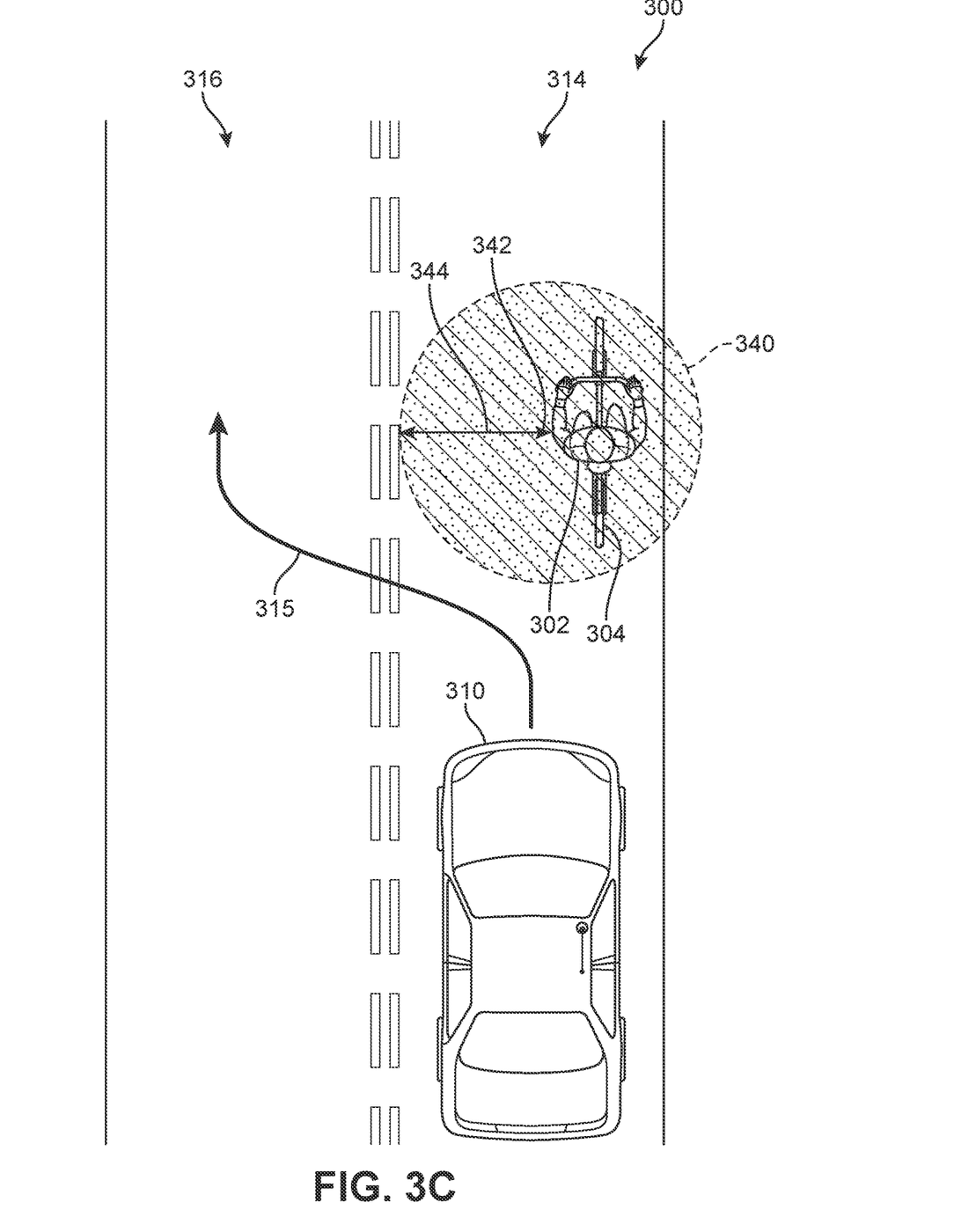
FIG. 3C is a diagram of a third embodiment of a cyclist user protected from a motor vehicle by an exclusion zone.

In contrast, FIG. 3C shows a third embodiment wherein exclusion zone 340 may extend laterally across an entire lane 314 of traffic. In this embodiment, exclusion zone 340 may be circular in shape and defined by radius 344 extending from central point 342 that is adjacent to the location of the cyclist 302. In this embodiment, motor vehicle may necessarily have to fully change lanes from first lane 314 to second lane 316 in order to avoid exclusion zone 340—as shown by motor vehicle course 315.

This exclusion zone 340 may be useful when, for example, local law requires that a passing motor vehicle 310 switch lanes whenever possible to pass a cyclist 302. Or, this embodiment may be useful when hazardous road conditions such as rain or snow might jeopardize the safety of the cyclist 302 when using an otherwise smaller exclusion zone.

Figure 4:
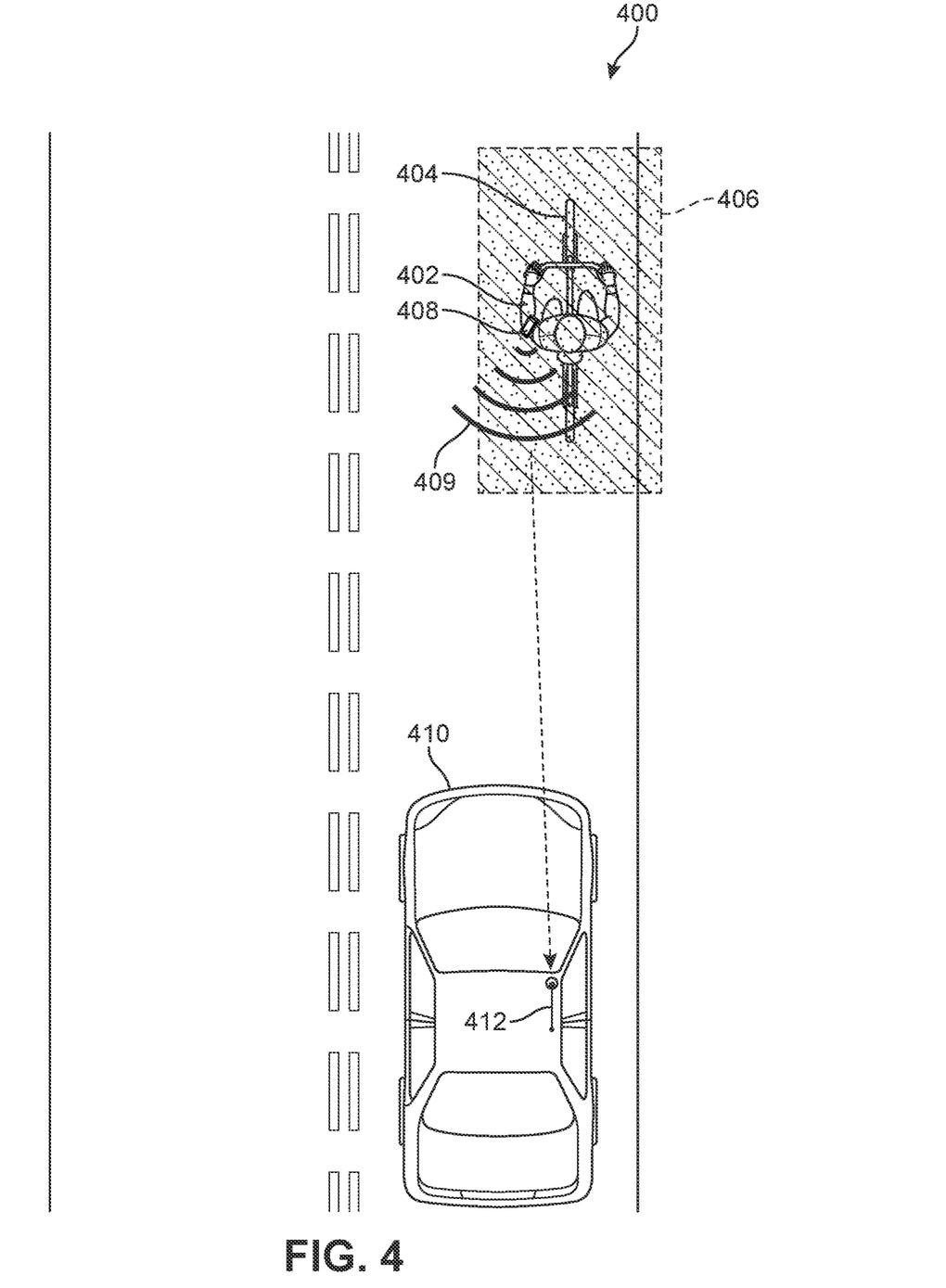
FIG. 4 is a diagram of a mobile computing device being in direct communication with a motor vehicle computing device.

FIG. 4 shows how a mobile computing device 408 may communicate directly with a motor vehicle 410. As discussed above with respect to FIG. 1, in some embodiments, a mobile computing device 102 may communicate with a server computing device 112 which then in turn may communicate with motor vehicle computing device 120. However, in the embodiment shown in FIG. 4, mobile computing device 408 may communicate directly with a motor vehicle computing device located on motor vehicle 410. In such an embodiment, step 216 of method 200 of sending the exclusion zone set of location coordinates may be performed by mobile computing device 408.

Namely, mobile computing device may emit an electronic signal 409 that has a limited local geographic range. Examples of such signals may include Wi-Fi, Bluetooth™, ultra-wideband (UWB), and wireless personal area network protocols such as IEEE 802.15.4, or other known network protocols. Generally, electronic signal 409 may have a longer range than the size of an exclusion zone 406—so that motor vehicle 410 can receive signal 409 before coming into close proximity with the exclusion zone 406.

In this way, mobile computing device 408 may be configured to emit signal 409 and motor vehicle 410 may be configured to receive signal 409 with e.g. antenna 412. Signal 409 may have a limited distance range, and motor vehicle 410 may receive the exclusion zone set of location coordinates from the mobile computing device 408 upon entering the limited distance range of signal 409. In this way, mobile computing device 408 may transmit a signal 409 that could be detected by any nearby motor vehicles 410.

This may then cause the two to be in direct electronic communication with each other. As a result, step 216 and step 220 of method 200 may be performed by the mobile computing device 408. Similarly, motor vehicle 410 computing device may receive the exclusion zone set of location coordinates 218 directly from mobile computing device and send confirmation data 222 back to mobile computing device 408 in response. Accordingly, autonomous and semi-autonomous vehicles in the geographic region of the cyclist 402 may automatically receive the exclusion zone set of location coordinates when they approach the cyclist 402 on a road.

Figure 5:
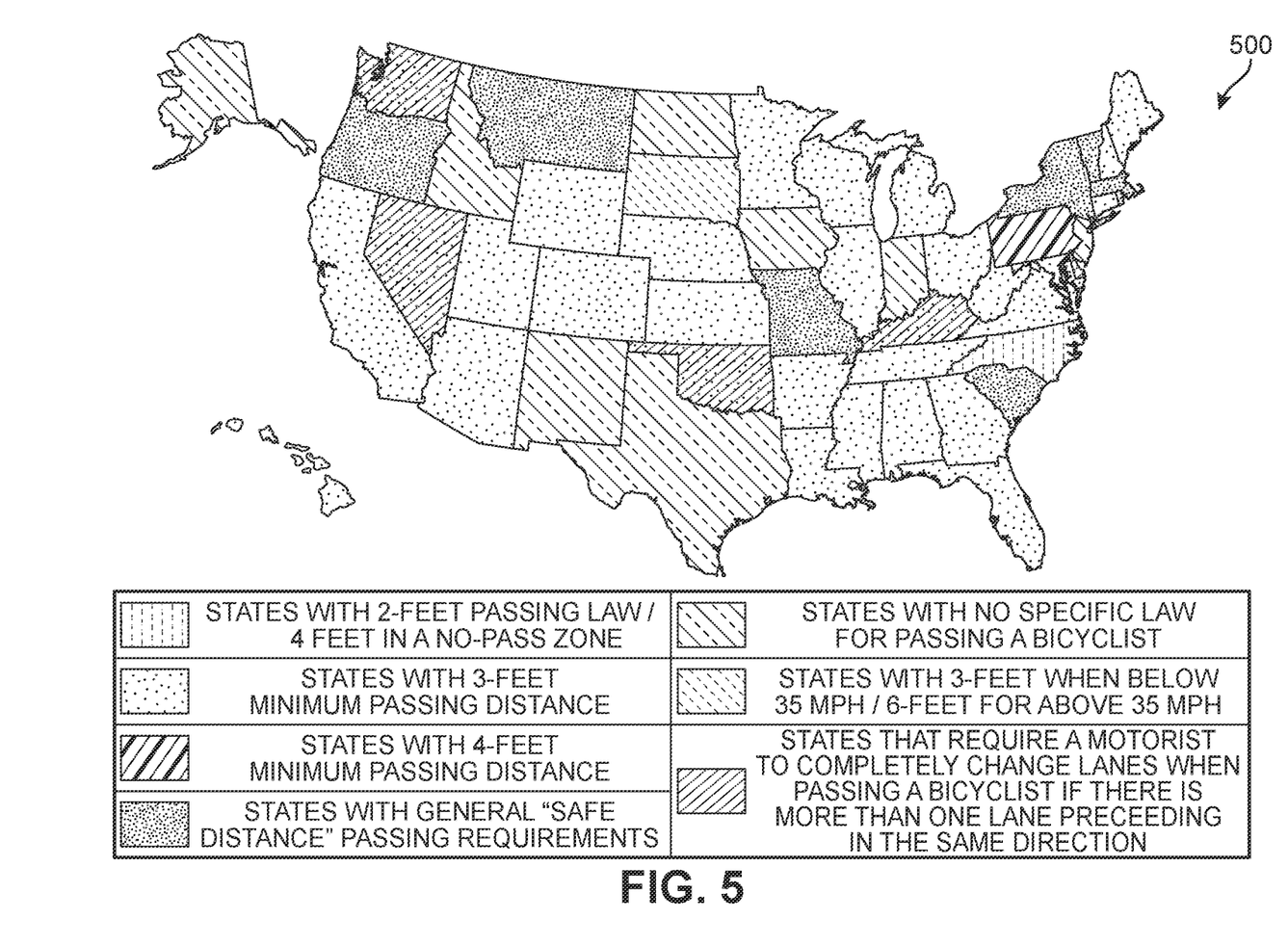
FIG. 5 is a graphical representation of data that may be contained in a legal database to be accessed by a system in accordance with this disclosure.

Next, FIG. 5 shows a map 500 that is a graphical representation of information that may be contained in legal database 114. Namely, in the United States of America the minimum legally required distance between a motor vehicle and a cyclist on a road is controlled by state law. Therefore, the jurisdictional information in legal database 114 may be state law in the state when the mobile computing device is currently located.

As shown in FIG. 5, many states may require a three foot minimum passing distance. A few other states may require a two foot minimum in certain conditions, or a four foot minimum under other conditions, or a four foot minimum distance at all times. The exact minimum distance required by a state's law is subject to change if, for example, the state's legislature passes a new law. Legal database 114 may be kept up to date by a proprietary party, or may be a an "open source" database maintained and kept up to date by collaborative efforts.

Generally, system 100 (or mobile computing device 102 itself) may query legal database 114 and receive data describing a minimum safety distance required by law—if any is applicable. If the state where the mobile computing device 102 is currently located does not have a minimum safety distance, either because the state does not have a law addressing the subject or merely has a general "safe distance" requirement, then step 206 of calculating the safety distance may default to a user safety distance preference 208 or a built-in default safety distance. Otherwise, step 206 may generally include calculating a safety distance that is at least that minimum required by law.

Figure 6:
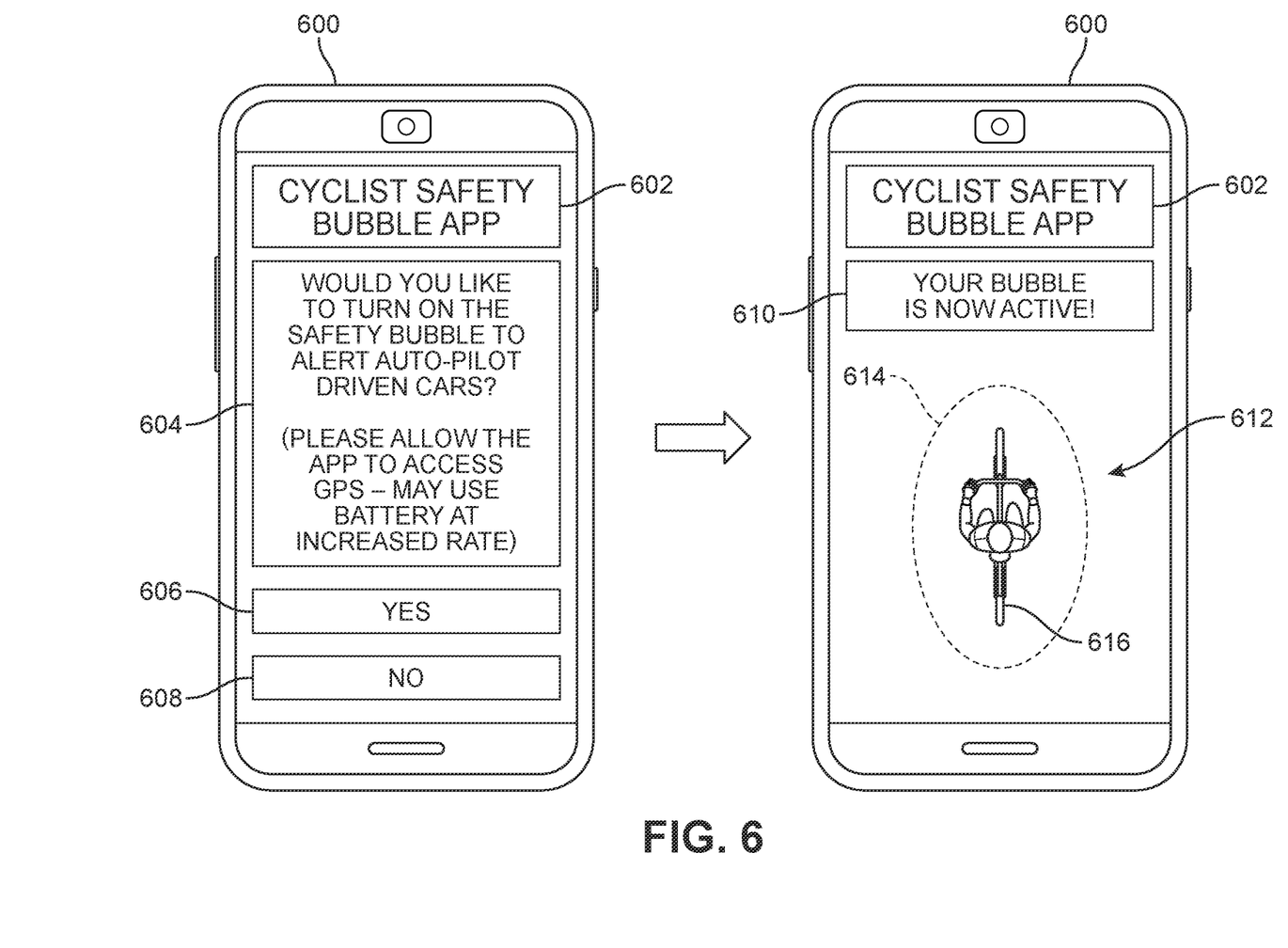
FIG. 6 shows diagrams of a first embodiment of a mobile computing device in accordance with this disclosure.
Figure 7:
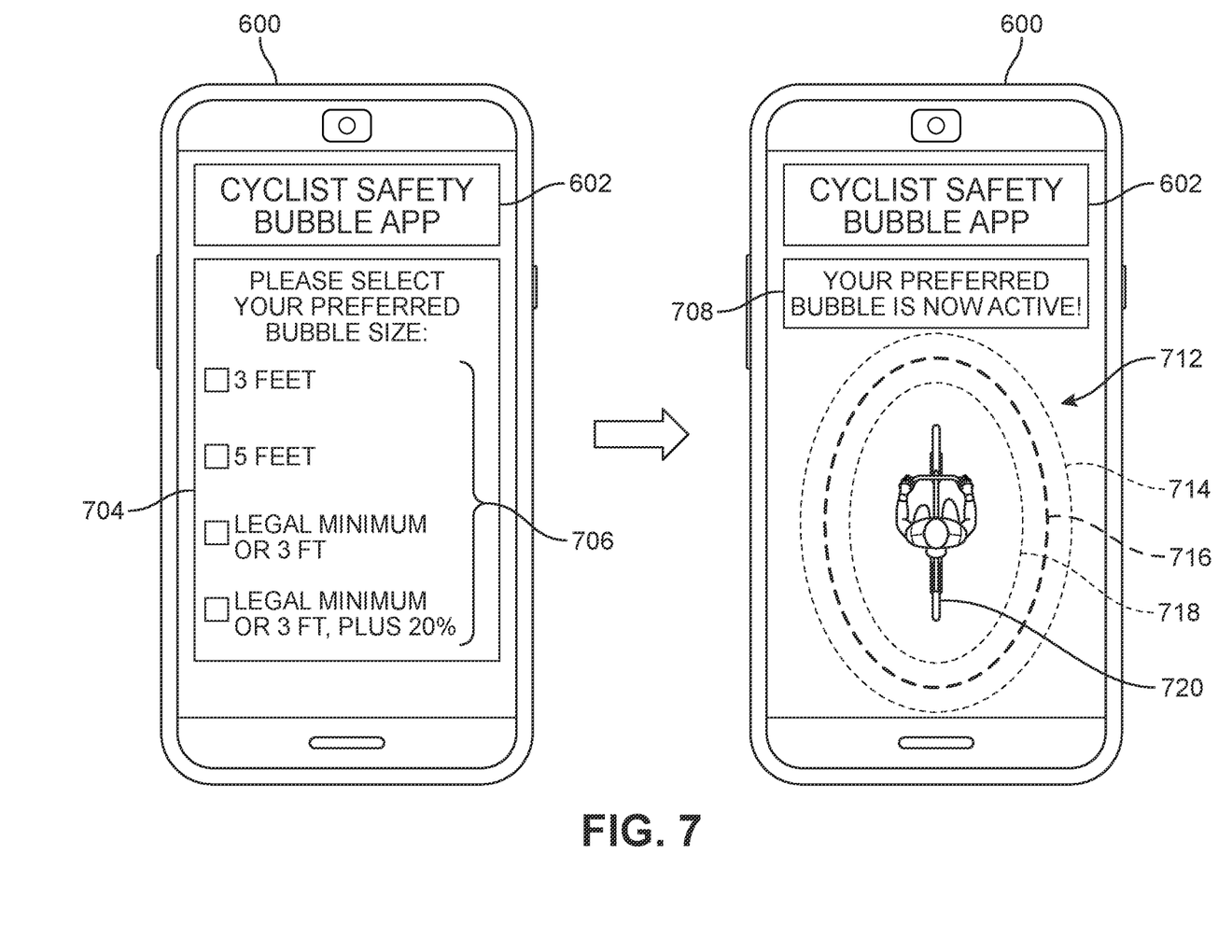
FIG. 7 shows diagrams of a second embodiment of a mobile computing device in accordance with this disclosure.

Finally, FIGS. 6 and 7 show various embodiments of a mobile computing device 600 in accordance with this disclosure. In some embodiments, mobile computing device 600 may be configured to execute several actions with its processor based on machine-readable instructions. Namely, mobile computing device 600 may perform method 200 as shown in FIG. 2 and discussed above.

In particular, mobile computing device 600 may (1) receive location data from a location positioning system describing a location of the mobile computing device; (2) receive a safety distance input from a user, the safety distance input being descriptive of the user's minimum safety distance preference; (3) calculate a safety distance around the location of the mobile computing device that is equal to or greater than the user minimum safety distance preference; (4) calculate an exclusion zone set of location coordinates based on the safety distance and the location of the mobile computing device; and (5) send the exclusion zone set of location coordinates to a motor vehicle computing device.

FIG. 6 shows particular features of a mobile computing device running an app 602 that performs the actions mentioned directly above. Namely, app 602 running on mobile computing device 600 may first generate a prompt 604 asking the user whether to turn on the exclusion zone "safety bubble". In response, the user may enter an input 606 or 608 that may activate the app to perform the functions mentioned above.

Upon receiving input 606, app 602 may generate a confirmation prompt 610 indicating to the user that the exclusion zone "bubble" is being calculated and transmitted. App 602 may include a graphical display 612 of the exclusion zone 614 around themselves 616. In this way, the user 616 may visually understand where the (otherwise invisible) exclusion zone is located.

FIG. 7 shows additional features of mobile computing device 600. Namely, app 602 may include a user safety distance preference prompt 704. This prompt may include several options 706 for different safety distances. In response, the user may select one of the several options 706 to generate the user safety distance preference input 208.

Mobile computing device 600 running app 602 may then provide confirmation prompt 708 and visual display 712 of the exclusion zone "bubble". In this embodiment, app 602 may display an exclusion zone 716 in comparison to one or more exclusion zones based on other (non-selected from the several options 706) safety distances—such as exclusion zone 714 and exclusion zone 718. In this way, user 720 may visually judge the relative size of each exclusion zone. This may allow user 720 to best select the choice from options 706 that meets their safety preferences and needs.

As a result of the above, the presently disclosed system, methods, and mobile computing device allows communication between a cyclist and an autonomous (or semi-autonomous) motor vehicle in order to provide enhanced safety for the cyclist travelling on along a road.

For each of the exemplary processes described above including multiple steps, it may be understood that in other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for enhancing motor vehicle safety in a vicinity of a bicyclist travelling on a road, comprising:
   a mobile computing device associated with a bicyclist; and
   at least one server computing device in electronic communication with the mobile computing device, the server computing device including a processor and machine-readable media including instructions which, when executed by the processor, cause the processor to
      receive from the mobile computing device location data describing a location of the mobile computing device;
      generate and send to the mobile computing device a prompt including multiple options for a safety distance;
      wherein the multiple options for a safety distance include one or more static options that are a set distance, and one more dynamic options that are based on a legal requirement of a minimum passing distance required by law in a location where the bicyclist is currently travelling on the road;
      receive a safety distance input selection from the bicyclist in response to the prompt, wherein the bicyclist selects one of the multiple options for the safety distance presented by the prompt;
      wherein the mobile computing device is configured to display a visual representation of the exclusion zone to the bicyclist in comparison to one or more exclusion zones based on safety distances that were not selected from the prompt including multiple options for the safety distance,
      calculate a safety distance around the location of the mobile computing device based on the safety distance input selection on the prompt;
      calculate an exclusion zone set of location coordinates based on the safety distance and the location of the mobile computing device; and
      send to a motor vehicle computing device the exclusion zone set of location coordinates, wherein the motor vehicle computing device is configured to maneuver the motor vehicle such that no part of the motor vehicle enters an area described by the exclusion zone set of location coordinates.

2. The system of claim 1,
   wherein calculating the safety distance around the location of the mobile computing device includes:
   calculating a lateral safety distance extending perpendicular to a direction of travel on the road; and
   calculating a longitudinal safety distance extending parallel to the direction of travel on the road.

3. The system of claim 1, wherein the server computing device is further configured to:
   query a legal database;
   receive from the legal database, in response to the query, legal data descriptive of a minimum safety distance required by law between a moving motor vehicle and a bicyclist travelling on a road in a jurisdiction where the mobile computing device is located; and
   calculate the safety distance around the location of the mobile computing device to meet or exceed the minimum safety distance required by law.

4. The system of claim 1, wherein the server computing device is further configured to:
   query a road database;
   receive from the road database, in response to the query, road data descriptive of one or more transitory aspects of the road where the mobile computing device is located; and
   calculate the safety distance around the location of the mobile computing device based on the road data.

5. The system of claim 1, wherein:
   the mobile computing device is in electronic communication with the server computing device via a network; and
   the server computing device is in electronic communication with the motor vehicle computing device via a network.

6. A method of enhancing motor vehicle safety in a vicinity of a bicyclist, the method comprising:
   receiving user location data descriptive of a bicyclist travelling on a road;
   querying a road database;
   receiving from the road database, in response to the query, road data descriptive of one or more transitory aspects of the road where the mobile computing device is located being selected from weather conditions, traffic conditions, and road construction; and
   calculating a safety distance around the location of the bicyclist based on the road data;
   calculating an exclusion zone set of location coordinates based on the safety distance and the user location data; generate a prompt including multiple options for a safety distance; wherein the multiple options for a safety distance include one or more static options that are a set distance, and one more dynamic options that are based on a legal requirement of a minimum passing distance required by law in a location where the bicyclist is currently travelling on the road; receive a safety distance input selection from the bicyclist in response to the prompt and displaying a visual representation of the exclusion zone to the bicyclist in comparison to one or more exclusion zones based on safety distances that were not selected from the prompt including multiple options for the safety distance; and
   sending the exclusion zone set of location coordinates to a motor vehicle navigation system;
   wherein the step of sending the exclusion zone set of location coordinates to a motor vehicle navigation system includes sending data descriptive of instructions for the motor vehicle to automatically navigate such that no part of the motor vehicle enters an area described by the exclusion zone set of location coordinates.

7. The method of claim 6, wherein the method further includes a step of:
receiving a safety distance input from the bicyclist descriptive of the bicyclist's safety distance preference; and the step of calculating a safety distance includes calculating a safety distance that is equal to or greater than the safety distance preference.

8. The method of claim 6, wherein the method further includes a step of:
receiving a legal minimum safety distance input descriptive of a minimum safety distance required by law between a moving motor vehicle and a bicyclist travelling on a road in a jurisdiction corresponding to the user location data; and
the step of calculating a safety distance includes calculating a safety distance that is equal to or greater than the legal minimum safety distance.

9. The method of claim 6, wherein the step of sending the exclusion zone set of location coordinates to a motor vehicle navigation system includes sending data over a network.

10. The method of claim 6, wherein the step of sending the exclusion zone set of location coordinates to a motor vehicle navigation system includes: sending data directly from a mobile computing device associated with the bicyclist to the motor vehicle navigation system.

11. The method of claim 6, wherein the step of sending the exclusion zone set of location coordinates to a motor vehicle navigation system includes sending data that causes the exclusion zone to appear as a navigational hazard displayed to a driver on a display associated with the motor vehicle navigational system.

12. A mobile computing device selected from a smartphone and a wearable computing device, configured to:
receive location data from a location positioning system describing a location of the mobile computing device;
generate a prompt including multiple options for a safety distance;
wherein the multiple options for a safety distance include one or more static options that are a set distance, and one more dynamic options that are based on a legal requirement of a minimum passing distance required by law in a location where the bicyclist is currently travelling on the road;
receive a safety distance input selection from a bicyclist in response to the prompt, wherein the bicyclist selects one of the multiple options for the safety distance presented by the prompt, the safety distance input selection being descriptive of the bicyclist minimum safety distance preference;
calculate a safety distance around the location of the mobile computing device that is equal to or greater than the bicyclist minimum safety distance preference based on the safety distance input selection on the prompt;
calculate an exclusion zone set of location coordinates based on the safety distance and the location of the mobile computing device;
display to the bicyclist, on a screen in the mobile computing device, a visual representation of the exclusion zone in comparison to one or more exclusion zones based on safety distances that were not selected from the prompt including multiple options for the safety distance; and
send the exclusion zone set of location coordinates to a motor vehicle computing device.

13. The mobile computing device of claim 12, wherein
the mobile computing device is further configured to emit a signal having a limited distance range that is larger than an area described by the exclusion zone set of location coordinates; and
the motor vehicle computing device receives the exclusion zone set of location coordinates upon entering the limited distance range, such that the mobile computing device is configured to send the exclusion zone set of location coordinates directly to the motor vehicle navigation system.

14. The mobile computing device of claim 12, wherein the mobile computing device is further configured to:
receive legal data describing a minimum safety distance required by law between a moving motor vehicle and a bicyclist travelling on a road in a jurisdiction corresponding to the location of the mobile computing device;
receive road data describing one or more transitory characteristics of the road where the mobile computing device is located, the one or more transitory aspects of the road being selected from weather conditions, traffic conditions, and road construction;
and wherein the step of calculating a safety distance includes calculating a safety distance that is equal to or greater than a minimum legal safety distance for the road characteristics based on the legal data and the road data.

15. The mobile computing device of claim 12, wherein the mobile computing device is further configured to:
calculate a lateral safety distance radius extending perpendicular to a direction of travel on a road where the mobile computing device is located; and
calculate a longitudinal safety distance radius extending parallel to the direction of travel on the road;
wherein the longitudinal safety distance radius is larger than the lateral safety distance radius.

16. The mobile computing device of claim 12, wherein the mobile computing device is a smartphone.

17. The mobile computing device of claim 12, wherein the mobile computing device is a wearable computing device.

18. The mobile computing device of claim 12, wherein the mobile computing device is further configured to:
receive confirmation data from the motor vehicle computing device, descriptive of the motor vehicle computing device having successfully received the exclusion zone set of location coordinates.

* * * * *